J. G. BARNSDALE.
MANIFOLD FOR INTERNAL COMBUSTION ENGINES.
APPLICATION FILED JULY 11, 1917.
1,264,477.
Patented Apr. 30, 1918.
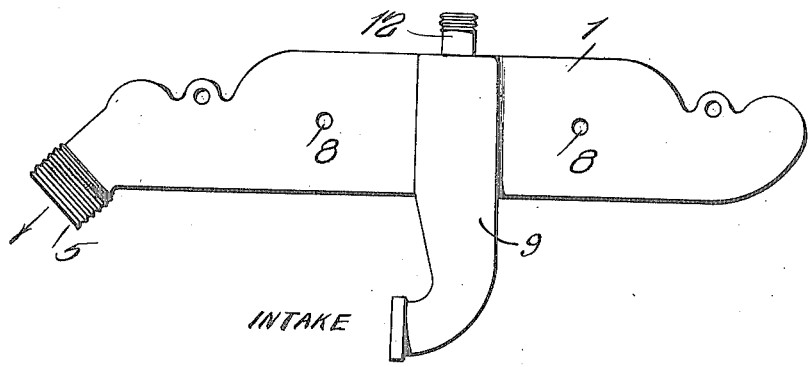
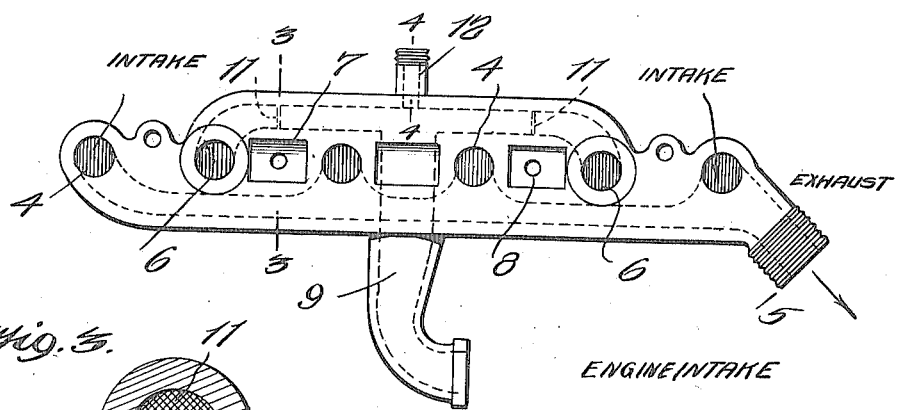
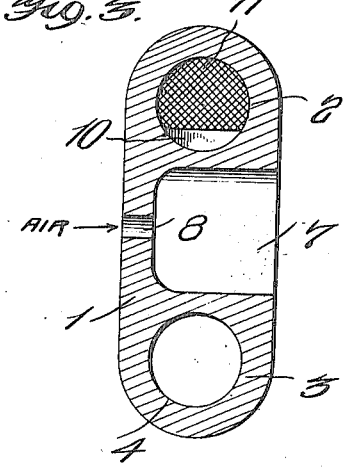
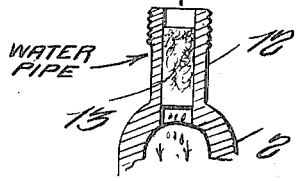
WITNESS
INVENTOR
JOHN G. BARNSDALE,
BY
ATTORNEYS

UNITED STATES PATENT OFFICE.

JOHN G. BARNSDALE, OF SUPERIOR, WISCONSIN.

MANIFOLD FOR INTERNAL-COMBUSTION ENGINES.

1,264,477.   Specification of Letters Patent.   Patented Apr. 30, 1918.

Application filed July 11, 1917. Serial No. 179,851.

*To all whom it may concern:*

Be it known that I, JOHN G. BARNSDALE, a citizen of the United States, and a resident of Superior, in the county of Douglas and State of Wisconsin, have invented new and useful Improvements in Manifolds for Internal-Combustion Engines, of which the following is a specification.

My invention is an improvement in manifolds for internal combustion engines, and the invention has for its object to provide a combined inlet and exhaust manifold, wherein means is provided in the intake part of the manifold for slowing the movement of the fuel and for thoroughly breaking up the same to provide for complete volatilization of the same, and wherein means is also provided for preventing the formation of carbon in the intake portion of the manifold.

In the drawings:

Figure 1 is a front view of the manifold;

Fig. 2 is a rear view;

Figs. 3 and 4 are sections on the lines 3—3 and 4—4, respectively, of Fig. 2.

In the present embodiment of the invention, a casing 1 is provided which is divided interiorly into an intake portion 2 and an exhaust portion 3. In connection with the exhaust chamber 3, ports 4 are provided for connection with the cylinders, to permit the exhaust from the cylinders to pass into the exhaust chamber, and at one end the casing has an externally threaded nipple 5 for connection with the engine exhaust or with a muffler.

The intake chamber 2 has at each end a port 6, the said ports being the intake ports for the chamber. Between the ports 4 and 6 air chambers 7 are provided, the said chambers being also between the intake and exhaust chambers, and sundry of the air chambers have ports 8 which extend through the front wall of the casing. These chambers are provided for the sake of lightness and to permit the passage of air through the casing. Intermediate its ends the pipe 9 leads from the intake chamber to the carbureter, this pipe 9 being the carbureter intake. Means is provided for slowing the travel of the fuel through the intake chamber and for thoroughly breaking up the same. The first named means comprise segmental baffle plates 10 which are held in the bore of the intake chamber across the bottom thereof, and the latter means comprises screens 11 which extend transversely of the chamber above the plates and form with the said plates partitions, partially perforate and partially imperforate, extending transversely of the bore.

A nipple 12 communicates with the chamber 2 at the top of the casing, and this nipple is externally threaded for engagement with a source of water supply (not shown). A wick 13 is arranged within the nipple, and it will be evident that the wick will feed the water slowly into the intake chamber, thus providing a better mixture, and preventing the formation of carbon in the said chamber. The exhaust being in the same casing with the intake, the heated gases will assist in vaporizing and breaking up the fuel as it passes through the manifold.

I claim:

1. A manifold for internal combustion engines, comprising a casing having two chambers, an exhaust and an intake chamber extending longitudinally thereof, the exhaust chamber having ports for connection with the respective cylinders of the engine and with the atmosphere, the intake chamber having a port intermediate its ends for connection with the carbureter, and ports at its ends for connection with the cylinders, baffle plates extending transversely of the intake chamber between the intake and the outlet ends thereof, each plate partially closing the lower part of the chamber, and a screen above each baffle plate, each screen and baffle plate forming a partially perforate and partially imperforate partition, and air chambers or recesses between sundry of the adjacent ports.

2. A manifold for internal combustion engines, comprising a casing having two chambers, an exhaust and an intake chamber extending longitudinally thereof, the exhaust chamber having ports for connection with the respective cylinders of the engine and with the atmosphere, the intake chamber having a port intermediate its ends for connection with the carbureter, and ports at its ends for connection with the cylinders, baffle plates extending transversely of the intake chamber between the intake and the outlet ends thereof, each plate partially closing the lower part of the chamber, and a screen above each baffle plate, each screen and baffle plate forming a partially perforate and partially imperforate partition.

3. A manifold for internal combustion engines, comprising a casing having two chambers, an exhaust and an intake chamber extending longitudinally thereof, the exhaust having ports in connection with the respective cylinders of the engine and with the atmosphere, the intake chamber having a port intermediate its ends for connection with the carbureter, and ports at its ends for connection with the cylinders, baffle plates extending transversely of the intake chamber between the intake and the outlet ends thereof, each plate partially closing the lower part of the chamber.

JOHN G. BARNSDALE.

Witnesses:
 NORA R. BRESEE,
 A. S. EATON.